United States Patent [19]
Yamauchi et al.

[11] 3,773,669
[45] Nov. 20, 1973

[54] VESSEL FOR USE IN HEATING FOOD IN A MICROWAVE OVEN

[75] Inventors: Noriyoshi Yamauchi, Nagoya; Ken Ishino, Nagareyama; Isao Yokoyama, Ichikawa, all of Japan

[73] Assignees: Nippon Toki Kabushiki Kaisha; T.D.K. Electronics Corporation, Nagoya-shi, Aichi-ken, Japan

[22] Filed: Feb. 22, 1972

[21] Appl. No.: 228,250

[30] Foreign Application Priority Data
Sept. 27, 1971 Japan.............................. 46/75227

[52] U.S. Cl....................... 252/62.58, 99/1, 106/45, 106/73.4, 219/10.55, 252/62.6, 252/62.61, 252/62.62, 252/62.64
[51] Int. Cl.. C04b 33/24, C04b 35/26, C04b 35/38
[58] Field of Search....................... 99/1; 219/10.55, 219/10.41, 20.41; 106/45, 39.7, 73.4; 252/62.58, 62.60, 62.61, 62.62, 62.64

[56] References Cited
UNITED STATES PATENTS
2,830,162  8/1958  Copson et al.................... 219/10.41
3,539,751  11/1970  Levinson........................... 219/10.55
2,852,653  9/1958  Koo .................................. 219/20.41

FOREIGN PATENTS OR APPLICATIONS
959,406  6/1964  Great Britain.................... 252/62.61
38,140   1/1963  Japan............................... 252/62.58

OTHER PUBLICATIONS

Hummel – "Thermal Expansion Properties of Some Synthetic Lithia Minerals" –J. Am. Cer. Soc. Vol. 34 No. 8 pp 235–239.

IBM Disclosure Bulletin Vol. 10, No. 5 "High-Frequency Mn–Zn Ferrites & Method of Their Preparation" p. 619.

*Primary Examiner*—Helen M. McCarthy
*Attorney*—Milton J. Wayne et al.

[57] ABSTRACT

A vessel (cooking utensil) for use in heating food in a microwave oven is disclosed. This vessel is produced from a sintered body obtained by firing a mixture of ferrite powder and eucryptite powder.

5 Claims, No Drawings

VESSEL FOR USE IN HEATING FOOD IN A MICROWAVE OVEN

BACKGROUND OF THE INVENTION

Recently, the use of microwave ovens (or Electronic ranges) in which food is heated by microwave energy has become popular. The heating in the microwave oven is effected by a microwave generated by a microwave oscillation generator such as a magnetron which is mounted in the oven. Heating by microwave energy is different from external heating which relies on the radiation or the conduction of heat. In microwave heating, the heating of food is achieved by the heat loss attributed to the rotational motion of water molecule contained in the food, said rotational motion being caused by the microwave energy. Accordingly, in this heating method, the temperature of the inner part of food rises rapidly and the food can be heated in a very short time, i.e., cooking time of the food can be reduced. However, it is well known that, in microwave heating, a "scorched area or scorching" cannot be produced on the surface of solid food to be cooked, such being obtainable by conventional heating. It is generally desired that cooked food have a "scorched area." This "scorched area" may be obtained by putting the food in a vessel which has been made from material which can generate heat by absorbing microwave energy and heating the food in the microwave oven. But, a suitable vessel or method which takes care of the above-mentioned purpose, has not yet been found.

A vessel which can meet the above-mentioned purpose should have the following properties:

1. The vessel can efficiently generate heat by absorbing microwave energy and the temperature of the vessel can rise above 200°C in a short time.
2. The vessel can stand rapid heating, for example, from about room temperature to about 300°C or even higher, when necessary, and also rapidly cooling from such an elevated temperature to about room temperature.
3. The vessel has the desirable configuration of a utensil for cooking food and has suitable mechanical strength.
4. The vessel has a reasonable price as household articles.

As an example of such a vessel for use in the microwave oven, a vessel having applied thereto a resistive material on the surface of a heat resisting glass by vacuum plating has been proposed. However, the vessel thus obtained has a drawback in that the layer of resistive material is easily peeled off, and accordingly such vessel is not yet in practical use.

U.S. Pat. No. 2,830,162 discloses utensils made of ferrimagnetic material such as ferrite or ferroelectric material such as lead or barium zirconate or lead or barium titanate for use in heating food in a microwave oven.

However, the utensils made of ferrite or zirconate (or titanate) are easily broken by "rapid heating and rapid cooling" in the microwave oven.

Such utensils therefore, have not been used in practice.

It is an object of the present invention to provide an improved vessel for use in heating food in the microwave oven.

SUMMARY OF THE INVENTION

The present invention relates to a vessel for use in heating food in a microwave oven (or "Electronic range"). This vessel comprises a sintered body of ferrite and eucryptite having a microwave absorbing characteristic and a very small thermal expansion coefficient. Accordingly, such a vessel has a characteristic in that its temperature rises by absorbing the microwave energy and the resistance against thermal spalling is high.

This sintered body is made by firing a mixture of ferrite powder and eucryptite powder at an elevated temperature. Ferrite is a compound having a general formula of $MFe_2O_4$ (M is a bivalent metal such as Mn, Mg, Cu, Ni or Zn) and has a property that it will absorb microwave energy (e.g., having frequency of 2.45 GHz, used in the microwave oven) with a resulting rise in temperature. Further, the ferrite has a positive thermal expansion coefficient of from $1\times10^{-4}/°C$ to $1\times10^{-5}/°C$, depending on the manufacturing conditions thereof such as the composition and the firing temperature. On the other hand, said eucryptite is lithium aluminosilicate having the formula of $LiAlSiO_4$, and is characterized by a negative thermal expansion coefficient of from $-1\times10^{-5}/°C$ to $-1\times10^{-6}/°C$, depending on the manufacturing conditions thereof.

A method of manufacturing the vessel of the present invention, which is used in the microwave oven, is as follows:

1. Ferrite powder and eucryptite powder (both having uniform particle size) are mixed in a fixed ratio in a ball mill.
2. The mixture is molded into a desired shape.
3. The molding (green briquette) is fired at a fixed temperature to obtain a sintered body.

The sintered body thus obtained can generate heat by absorbing the microwave energy and the temperature of it can reach above 200°C in a few minutes, and said sintered body can stand such rapid heating (and also rapid cooling) because of the small thermal expansion coefficient thereof, such as $-1\times10^{-5}/°C$ to $1\times10^{-5}/°C$.

Four ways of manufacturing said sintered body are available; that is:

I. A mixture of MO (M is a bivalent metal) and $Fe_2O_3$ is molded and then fired to produce a sintered body of ferrite, and this sintered body is pulverized into ferrite powder. On the other hand, a mixture of $Li_2O$, $Al_2O_3$ and $SiO_2$ is molded and then fired to produce eucryptite, and this eucryptite is pulverized into eucryptite powder. A mixture of the ferrite powder and the eucryptite powder in a fixed ratio is molded and then fired.

II. A mixture of $Li_2O$, $Al_2O_3$ and $SiO_2$ in such a ratio that eucryptite will be produced when fired, is mixed in a fixed ratio with ferrite powder as obtained according to procedure (I), and the mixture thus obtained is molded and fired.

III. A mixture of MO and $Fe_2O_3$ in such a ratio that ferrite will be produced when fired, is mixed in a fixed ratio with eucryptite powder as obtained according to procedure (I) and the mixture thus obtained is molded and fired.

IV. A mixture of MO, $Fe_2O_3$, $Li_2O$, $Al_2O_3$ and $SiO_2$ in such a ratio that a mixed sintered body of ferrite and eucryptite in a fixed ratio will be produced when fired, is molded and fired.

To produce the vessel for use in heating food of the present invention, i.e., to produce the sintered body of ferrite and eucryptite, procedures designated as (I) and (II) are deemed to be most suitable. As a bivalent metal, (M), Ni, Cu, Mn, Mg or Zn may suitably be used. Among them, Mn, Mg and Zn are of practical use because of their low price. In the following examples, therefore, Mn-Zn ferrite is used as the ferrite component.

The following examples are given by way of illustration of the methods of carrying out the present invention according to the above procedures (I) and (II) and are not intended as a limitation of this invention.

Example I

According to procedure (I) supra, ferrite-eucryptite sintered body was made from the following ingredients (in Table - 1):

TABLE - 1

| Sample No. | Mn-Zn ferrite powder | Eucryptite powder | Clay (illustratively Kaerume-clay*) |
|---|---|---|---|
| 1 | 30%** | 61% | 9% |
| 2 | 40 | 50 | 10 |
| 3 | 60 | 32 | 8 |
| 4 | 80 | 20 | 0 |
| 5 | 90 | 10 | 0 |

*Gairome-clay is a type of clay found in Japan
** "percent" is "percent by weight."

Details of the process for manufacturing the ferrite-eucryptite sintered body is as follows:

A mixture of 0.8 mol of $MnCO_3$, 1.2 mols of $ZnO$ and 2 mols of $Fe_2O_3$ was molded and then fired at a temperature of about 1,300°C for 1 hour. The Mn-Zn ferrite sintered body thus obtained was pulverized to form a Mn-Zn ferrite powder having particle size of about 1 $\mu$. On the other hand, a mixture of 1.2 mols of $Li_2O$, 1 mol of $Al_2O_3$ and 2 mols of $SiO_2$ was molded and then fired at a temperature of about 1,200°C for 2 hours. The eucryptite sintered body thus obtained was pulverized to make eucryptite powder having a particle size of about 10 $\mu$.

The ferrite powder and the eucryptite powder were mixed in a ratio in the above Table - 1, and the mixture was molded into the desired shape and then fired at a temperature of about 1,150°C for about 3 hours. A deep brownish ferrite-eucryptite sintered body having the desired shape was thus obtained.

In the above process, the firing temperature of 1,150°C was used. However, depending on the composition of ferrite and eucryptite, a firing temperature of from about 1,050°C to about 1,350°C can be used to produce a preferred sintered body.

Example 2

According to (II) above, a ferrite-eucryptite sintered body was made from the following ingredients (in Table - 2):

$Li_2CO_3$ was used as a source of $Li_2O$, and Kato-kaolin or Gairome-clay was used as sources of $Al_2O_3$ and $SiO_2$ (Kato-kaolin is a type of kaolin found in Korea).

TABLE - 2

| Sample No. | Mn-Zn ferrite powder | $Li_2CO_3$ | $Al_2O_3$ | Kato-kaolin | Clay (illustratively Gairome-clay) |
|---|---|---|---|---|---|
| 6 | 30%* | 14% | —% | 56% | —% |
| 7 | 40 | 12 | 4 | — | 44 |
| 8 | 60 | 7.7 | — | 32.3 | — |
| 9 | 80 | 4.5 | — | 15.5 | — |
| 10 | 90 | 2.1 | — | 7.9 | — |

* "percent" is "percent by weight."

A ferrite-eucryptite sintered body was obtained by repeating the same procedure as that of Example 1 except that $Li_2CO_3$, $Al_2O_3$ and Kato-kaolin (or Gairome-clay) were mixed with Mn-Zn ferrite powder (as obtained in Example 1) in a ratio shown in the Table - 2.

Properties of the ferrite-eucryptite sintered body are collectively shown in the following Table - 3.

TABLE - 3

| Sample No. | Thermal* expansion coefficient ($\times 10^{-6}$) | Temperature difference of spalling (°C) | Temperature to be reached (°C) | Water absorption (%) |
|---|---|---|---|---|
| 1 | −1.5 | 400 | 150 | 4.2 |
| 2 | −1.2 | 400 | 180 | 4.2 |
| 3 | 1.0 | >400 | 240 | 4.5 |
| 4 | 7.2 | 300 | 290 | 6.0 |
| 5 | 8.0 | 250 | 330 | 6.0 |
| 6 | −2.0 | 400 | 150 | 4.5 |
| 7 | −2.0 | 400 | 180 | 5.1 |
| 8 | 1.7 | 400 | 230 | 4.4 |
| 9 | 7.5 | 280 | 290 | 5.8 |
| 10 | 8.5 | 250 | 330 | 6.0 |

*The thermal expansion coefficient is shown in the mean value between 20°C and 500°C.

In the above Table - 3, "Temperature difference of spalling" means that the sintered body is resistant to the thermal spalling up to this temperature difference, and "Temperature to be reached" means the maximum temperature to which the temperature of the sintered body may reach in four minutes when the sintered body is used in a microwave oven for home use, using the microwave of 2.45 $GH_z$ and having the power of 550W. "Water absorption" is shown as one of the properties of the sintered body.

From the values in the Table - 3, the following facts become evident:

1. A sintered body having a low percentage of ferrite component and a higher percentage of eucryptite component shows high thermal expansion coefficient in the negative value.

2. As the percentage of ferrite component increases, the thermal expansion coefficient decreases to reach the minimum value and then increases in the positive value.

3. As the percentage of ferrite component increases, the "Temperature to be reached" increases and the maximum temperature obtained is above 400°C.

As previously stated, a vessel (for use in heating food) having low thermal expansion coefficient, large "Temperature difference of spalling" and high "Temperature to be reached" is deemed to be most suitable. Accordingly, as can be seen from the Table - 3, a sintered body consisting of a ferrite component of from 40 to 80 percent by weight and a eucryptite component of from 60 to 20 percent by weight is suitably used as a vessel of the present invention.

The ferrite-eucryptite sintered body has a property of water absorption and said sintered body having a larger proportion of ferrite-component generally shows higher water absorption. In order to prevent such water absorption and improve the appearance of the sintered body, a glaze may be applied to the sintered body in the same manner as that in pottery manufacturing. For example, kaolin is added to a frit comprising kaolin, feldspar, quartz and limestone, and this mixture is ground. A suspension is obtained by adding water to said mixture. After this suspension is applied to the surface of the sintered body and dried, the sintered body is fired to transform the ingredients of the suspension into glass and fix the glass to the sintered body.

The ferrite-eucryptite sintered body thus obtained is suitably useful as a vessel for heating food in a microwave oven. Thus, when solid food to be cooked is put in a vessel and treated in the microwave oven, the food is internally heated by the microwave energy and simultaneously its exterior is also heated in its outside by the vessel having the elevated temperature. Thus, the cooked food having a "scorched area" on its surface can be obtained. That is to say, said cooked food has the same appearance as that of a cooked food obtained by conventional heating such as "heating by the radiation or the conduction of heat."

What is claimed is:

1. A vessel for use in heating food in a microwave oven consisting essentially of a sintered body of about 40 to 80 percent by weight of a ferrite compound of the formula $MFe_2O_4$ in which M is a bivalent metal selected from the group consisting of Ni, Cu, Mn, Mg, and Zn, and about 60 to 20 percent by weight of an eucryptite component of the formula $LiAl SiO_4$.

2. A vessel according to claim 1 wherein said ferrite component has a Mn–Zn component.

3. A method of manufacturing a vessel for use in heating food in a microwave oven comprising firing at from about 1050°C to 1350°C for up to 3 hours a molding of a mixture of from about 40 to 80 percent by weight of ferrite powder of the formula $MFe_2O_4$ in which M is a bivalent metal selected from the group consisting of Ni, Cu, Mn, Mg, and Zn, and from about 60 to 20 percent by weight eucryptite powder of the formula $LiAlSiO_4$.

4. A method according to claim 3 wherein said ferrite powder has a particle size of about 1 $\mu$.

5. A method according to claim 3 wherein said eucryptite powder has a particle size of about 10 $\mu$.

* * * * *

UNITED STATES PATENT OFFICE
CERTIFICATE OF CORRECTION

Patent No. 3,773,669                           Dated November 20, 1973

Inventor(s) Noriyoshi Yamauchi, et al

It is certified that error appears in the above-identified patent and that said Letters Patent are hereby corrected as shown below:

Column 3, line 22:   "Kaerume" should be replaced by ---Gairome---.

Column 3, lines 13 & 14:   "Example I" should appear on a separate and independent line.

Column 3, line 52:   "Example 2" should appear on a separate and independent line.

Signed and sealed this 16th day of July 1974.

(SEAL)
Attest:

McCOY M. GIBSON, JR.                      C. MARSHALL DANN
Attesting Officer                         Commissioner of Patents